Feb. 7, 1961  JEAN-MICHEL BALUTEAU  2,970,517
VARIABLE FOCUS OPTICAL SYSTEM
Filed May 7, 1957  3 Sheets-Sheet 1

INVENTOR
JEAN-MICHEL BALUTEAU
BY Cameron, Kerkam & Sutton
ATTORNEYS

United States Patent Office 2,970,517
Patented Feb. 7, 1961

2,970,517
VARIABLE FOCUS OPTICAL SYSTEM

Jean-Michel Baluteau, Paris, France, assignor to Societe d'Optique et de Mecanique de Haute Precision, Paris, France, a company of France Filed May 7, 1957, Ser. No. 657,598

Claims priority, application France May 7, 1956

1 Claim. (Cl. 88—57)

The present invention relates to an optical system allowing an object situated at a fixed distance to yield an image whereof the size can vary continuously between two limits, and in such a way that the plane of the said image remains virtually fixed while it is varying in size.

Optical systems comprising two lenses situated on either side of a fixed lens have already been constructed for this purpose, the same translational movement along the optical axis being imparted to the first-named lenses. However, in these systems, even with the greatest degree of improvement, the final image is still appreciably displaced. In particular, when these systems are associated for example with a photographic objective intended to project the image on to a sensitive emulsion, the distances become considerable when the focal length of the assembly exceeds a certain value, and upset the clarity of the image obtained.

In the optical system which forms the subject of the invention, the total amplitude of image displacements produced remains less than one hundredth of that obtained with earlier devices for a given variation in image size and a given bulk.

According to the invention, the optical system of variable focal length consists of five elements, the first, third and fifth elements having the same sign, and forming an assembly which is movable with respect to the second and fourth elements, which have the opposite sign to that of the movable elements, and form a fixed assembly.

The new system allows the final image to be passed six times through the same position during displacement of the movable assembly in order to achieve the variation in magnification provided for.

Both the principle on which an optical system according to the invention is arranged and an example of an embodiment of such an optical system are defined hereinafter with reference to the various diagrams in the accompanying drawings.

In the drawings

Figure 1:
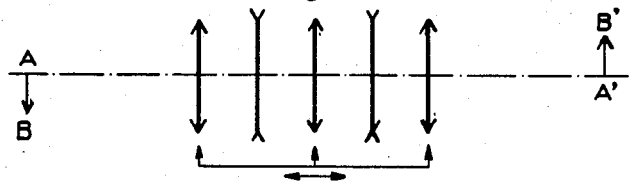
Figures 1 and 2 are basic diagrams of the construction of the optical system.
Figure 2:
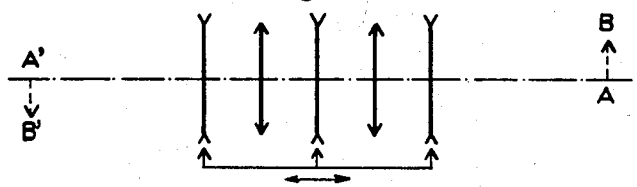

As shown by the diagrams in Figures 1 and 2, the optical system consists of five elements $L_1$, $L_2$, $L_3$, $L_4$, $L_5$. These elements, which can each comprise one or more lenses, are alternately convergent and divergent. The elements $L_1$, $L_3$, $L_5$ are movable, and connected integrally with one another, with respect to the elements $L_2$, $L_4$, which are fixed.

If the movable elements $L_1$, $L_3$, $L_5$ are convergent (Figure 1), the fixed elements $L_2$, $L_4$ are divergent, and vice versa (Figure 2).

Figure 3:
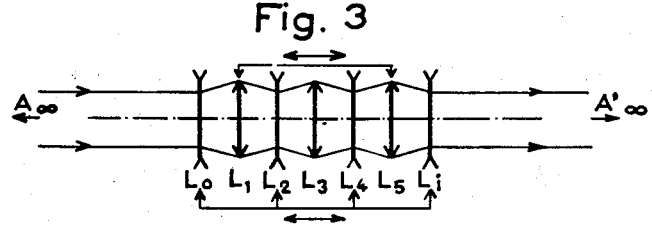
Figures 3, 4 and 5 are basic diagrams, each showing a combination of the optical system with two additional elements defining respectively the position of the object and the image.

The additional fixed elements which displace the object or the image, or both, can naturally be placed in front of or behind the system formed as indicated above. Additional elements $L_0$ and $L_1$ which project the object and the image to infinity can more particularly be provided (Figure 3). In this case, the displacement of the movable elements which effects the variation of magnification becomes a relative movement, and it does not matter whether the elements $L_0$ $L_2$ $L_4$ $L_1$ or $L_1$ $L_3$ $L_5$ are displaced.

If, after determining the size of the five-element system and the spacings, the powers of the five elements and the positions of the object and the image are chosen as unknows, there will be seven unknowns, and it is possible, for a predetermined stroke of the three movable elements, on the one hand to achieve a given ratio of variation in magnifiication, and on the other hand to cause the image to pass six times through the same position.

If on the other hand the object or the image is assumed to be near, the image can only pass five times through the same position. It will only be able to pass four times through the same position if both the object and the image are assumed to be near.

Figure 4:
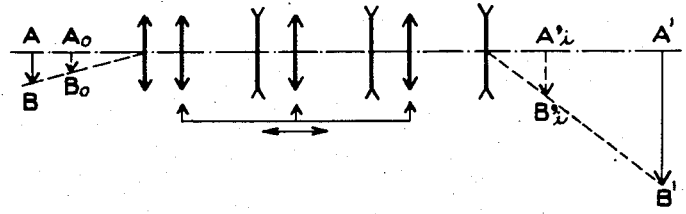

The two latter cases will be neglected hereinafter, and attention will be paid to the first, which is clearly the most favourable as regards displacement of the image. It should furthermore be noted that the five-element assembly can always be made to work between two determined conjugate planes, while the image passes through the same position six times, either by altering its scale or by adding to it fixed elements which bring the object and the image as near as is required (Figure 4).

A system according to the invention may be worked out as follows.

Figure 5:
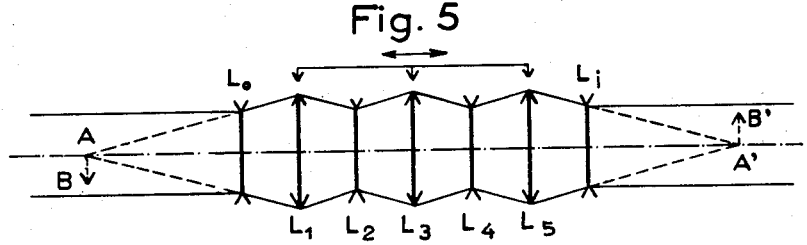

It is assumed that the object AB is at the image focus of an element $L_0$, and the final image A'B' is at the object focus of an element $L_1$ (Figure 5). This leads to determination of the powers of seven elements of an afocal system, so that the ratio of magnifications has a determined value R at the end of the stroke of the movable parts $L_1$ $L_3$ $L_5$, and the power of the assembly is cancelled six times during the translational movement. It will be noted that the total power of the seven-element assembly, whereof the powers of the said elements are considered as parameters, and the spacing $e$ between two consecutive elements is considered to be variable, can be expressed in the form of a sixth-degree multinomial expression in "$e$."

The simplest method is to assume that the seven-element assembly is symmetrical in the mean position of the movable parts. It can then be stated that at the beginning of the stroke, starting from one end position, magnification is equal to one of the four values $\pm\sqrt{R}$, $$\pm\sqrt{\frac{1}{R}}$$

and for example that the power of the assembly is zero at the beginning of the stroke, and at quarter- and half-stroke.

Figure 6:
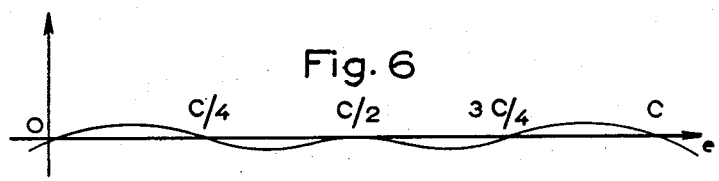
Figures 6, 7, 8, 9 and 11 represent different image position curves.

For reasons of symmetry, the curve representing the variations in the position of the image produced by the first six elements, as a function of $e$, has the shape illustrated in Figure 6. This image passes through the same position six times for a total stroke C.

The long calculation will not be given here in detail. However, it may be noted that the solutions given hereinafter are the most advantageous in solving the problem.

In fact, they lead to the greatest focal lengths for the various lenses, and to a very low Petzval sum. They correspond to an image A'B' which is reversed with respect to the object AB.

Solution 1

This solution applies to the case wherein the movable elements $L_1$ $L_3$ $L_5$ are convergent.

In the mean position, the spacings between the various elements are all equal to 1. The object is projected to infinity by the element $L_0$. In the table below, wherein each element is reduced to a simple lens, the powers $\varphi_0$ to $\varphi_1$ of the lenses $L_0$ to $L_1$ are shown

|  |  |  |  |  |
|---|---|---|---|---|
|  | $L_0$ | $\varphi_0 = -0.1127805$ | $e_0 = 1$ | |
| Movable Lenses | → $L_1$ | $\varphi_1 = +0.2784000$ | $e_1 = 1$ | |
|  | $L_2$ | $\varphi_2 = -0.4898448$ | $e_2 = 1$ | Spacings in mean position. |
| Do | → $L_3$ | $\varphi_3 = +0.4310086$ | $e_3 = 1$ | |
|  | $L_4$ | $\varphi_4 = \varphi_2$ | $e_4 = 1$ | |
| Do | → $L_5$ | $\varphi_5 = \varphi_1$ | $e_5 = 1$ | |
|  | $L_i$ | $\varphi_i = \varphi_0$ | | |

The following table gives the position of the image produced by the assembly consisting of the lenses $L_0$ to $L_5$ with respect to the fixed lens $L_i$, as a function of the spacing $e_0$.

| $e_0$ | 0.3 | 0.5 | 0.7 | 1 | 1.3 | 1.5 | 1.7 |
|---|---|---|---|---|---|---|---|
| $x_1$ | +8.866989 | +8.866828 | +8.866866 | +8.866788 | +8.866823 | +8.866795 | +8.866818 |

The ratio of image sizes for $e_0 = 0.3$ and $e_0 = 1.7$ is $R = 4.56$.

Figure 7:
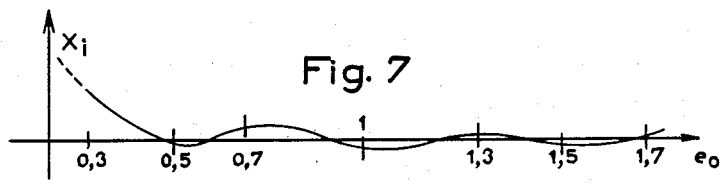

Figure 7 shows the variations of $x_1$ (image abscissa A'B' with respect to the lens $L_1$) as a function of $e_0$.

Solution 2

This solution applies to the case wherein the movable elements $L_1$ $L_3$ $L_5$ are diverging.

As in Solution 1, the spacings between the various lenses are all equal to 1 in the mean position, and the object is projected to infinity by the lens $L_0$. The table below gives the powers $\varphi_0$ to $\varphi_1$ of the lenses $L_0$ to $L_1$.

|  |  |  |  |  |
|---|---|---|---|---|
|  | $L_0$ | $\varphi_0 = +0.0914890$ | $e_0 = 1$ | |
| Movable lenses | → $L_1$ | $\varphi_1 = -0.2892400$ | $e_1 = 1$ | |
|  | $L_2$ | $\varphi_2 = +0.3539370$ | $e_2 = 1$ | Spacings in mean position. |
| Do | → $L_3$ | $\varphi_3 = -0.4854196$ | $e_3 = 1$ | |
|  | $L_4$ | $\varphi_4 = \varphi_2$ | $e_4 = 1$ | |
| Do | → $L_5$ | $\varphi_5 = \varphi_1$ | $e_5 = 1$ | |
|  | $L_i$ | $\varphi_i = \varphi_0$ | | |

The following table gives the position of the image produced by the assembly consisting of the lenses $L_0$ to $L_5$, as a function of the spacing $e_0$, with respect to the fixed lens $L_i$.

| $e_0$ | 0.3 | 0.5 | 0.7 | 1 | 1.3 | 1.5 | 1.7 |
|---|---|---|---|---|---|---|---|
| $x_1$ | −10.930260 | −10.930225 | −10.930274 | −10.930275 | −10.930257 | −10.930147 | −10.930247 |

Figure 8:
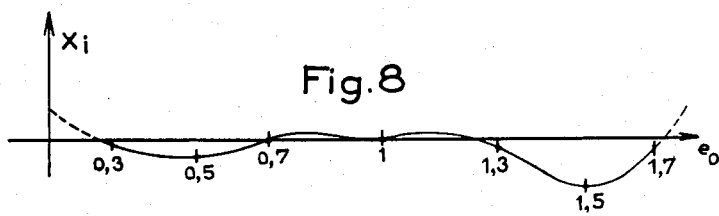

Figure 8 shows the variations of $x_1$ as a function of $e_0$.

The ratio of image sizes for $e_0 = 0.3$ and $e_0 = 1.7$ is $R' = 0.256$.

Solution 3

Starting from Solution 1, the same system having five lenses $L_1$ to $L_5$ can be used, the movable lenses being convergent.

The following table gives the powers $\varphi_1$ to $\varphi_5$ of the five lenses.

|  |  |  |  |
|---|---|---|---|
| Movable convergent lenses | → $L_1$ | $\varphi_1 = +0.278400$ | $e_1 = 1$ |
|  | $L_2$ | $\varphi_2 = -0.4898448$ | $e_2 = 1$ |
| Do | → $L_3$ | $\varphi_3 = +0.4310086$ | $e_3 = 1$ Spacings in mean position. |
|  | $L_4$ | $\varphi_4 = \varphi_2$ | $e_4 = 1$ |
| Do | → $L_5$ | $\varphi_5 = \varphi_1$ | |

The following table gives the position of the images produced by the five lenses with respect to the fixed lens $L_4$, as a function of the spacing $e_1$, when the object is placed in front of the system at 10.866781 from the fixed lens $L_2$.

| $e_1$ | 0.5 | 0.7 | 1 | 1.3 | 1.5 |
|---|---|---|---|---|---|
| $x_4$ | +10.866828 | +10.866866 | +10.866788 | +10.866823 | +10.866795 |

Figure 9:
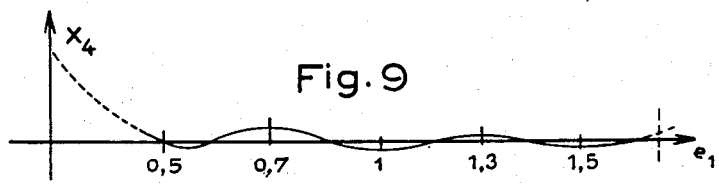

Figure 9 shows the variations of $x_4$ (abscissa of the image A'B' with respect to the lens $L_4$) as a function of $e_1$.

Solution 4

Starting from Solution 2, the same system having five lenses $L_1$ to $L_5$ can be used, without the system being symmetrical.

Figure 10:
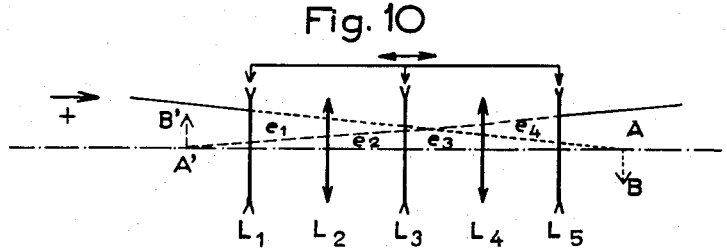
Figure 10 is a basic diagram relating to an asymmetrical solution of the optical system.

In Figure 10, which shows such a system having ten lenses, the respective positions of the virtual object and the virtual image are shown.

The following table gives the powers $\varphi_1$ to $\varphi_5$ of the lenses $L_1$ to $L_5$.

|  |  |  |  |
|---|---|---|---|
| Divergent movable lenses | → $L_1$ | $\varphi_1 = -0.5370132$ | $e_1 = 1$ |
|  | $L_2$ | $\varphi_2 = +0.411$ | $e_2 = 1$ |
| Do | → $L_3$ | $\varphi_3 = -0.3555352$ | $e_3 = 1$ |
|  | $L_4$ | $\varphi_4 = +0.322$ | $e_4 = 1$ |
| Do | → $L_5$ | $\varphi_5 = -0.393$ | |

The virtual object AB is at 3.92715 behind the fixed lens $L_2$.

The virtual image A'B' is at 5.28 in front of the fixed lens $L_4$.

When $e_1$ varies from 0 to 1.5, the magnification of the system varies between −0.422 and −2.397, which gives a ratio R = 0.176.

All the calculations need not be done again in order to determine an optical system providing another magnification ratio at the ends of the stroke of the movable elements. The following method may be used, starting for example from one of the Solutions 1 or 2 defined above:

Let $\epsilon$ and $\epsilon'$ be the values of the spacing $e_0$ for which the image assumes, in the first half of the stroke, the same abscissa as in the mean position (Figure 11), and let $\Delta g$ be the variation in magnification to be achieved for $e_0 = \epsilon'$.

A variation of $d\varphi_0$ is first of all effected on the first lens $L_0$, and the symmetry of the system is re-established by slightly altering the power of the middle lens $L_3$. The displacement $dx_0$ of the image is calculated for $\epsilon$, and the displacement $dx'_0$ and the variation of $dg_0$ for $\epsilon'$.

A variation $d\varphi_1$ and $d\varphi_5 = d\varphi_1$ is then effected on the first and fifth lenses $L_1$ and $L_5$ of the five-lens system, again re-establishing symmetry by means of the middle lens $L_3$. The variation $dx_1$, $dx'_1$, $dg_1$ are determined.

Finally, the variations $d\varphi_2$ and $d\varphi_4 = d\varphi_2$ are likewise introduced, and the quantities $dx_2$, $dx'_2$ and $dg_2$ are noted.

In order to obtain the variation $\Delta g$ for $e_0 = \epsilon'$, without altering the shape of the curve 11, it is sufficient to effect the variations $k_0 d\varphi_0$, $k_1 d\varphi_1$ and $k_2 d\varphi_2$ on the powers of the lenses $L_0$, $L_1$, $L_2$, and to make the system perfectly symmetrical with respect to the lens $L_3$. The coefficients $k_0$, $k_1$ and $k_2$ are the coefficients which must satisfy the three equations:

$$k_0 dx_0 + k_1 dx_1 + k_2 dx_2 = 0$$
$$k_0 dx'_0 + k_1 dx'_1 + k_2 dx'_2 = 0$$
$$k_0 dg_0 + k_1 dg_1 + k_2 dg_2 = \Delta g$$

This method is very well justified for a low value of $\Delta g$, since it can then be assumed that the quantities $dx$ and $dg$ are proportional to the variations $d\varphi$. If these operations are repeated several times, the value arrived at is noticeably different from the ratio of the magnifications at the ends of the stroke.

A symmetrical system has been used as the basis of argument in the preceding calculations for the sake of greater convenience, but the invention is clearly not limited to such a system. Furthermore, it is not necessary to make the image pass six times through the same position in order that it may be displaced by very small amounts. The equation of the curve representing these displacements as a function of the variable spacing $e_0$ can have two pairs of imaginary roots, or can have roots falling outside the stroke allowed to the movable lenses.

The optical system which forms the subject of the invention and is defined by one or other of the solutions given above, is capable of numerous uses, whereof the most usual are variable-magnification image-carriers and variable-focal length objectives for photography or cinematography.

By way of example, and in order to indicate proportions, if a size of 350 mm. is adopted for Solution 2 defined above, and if this system is placed in front of an objective whereof the focal length is equal to 350 mm., the total amplitude of image displacements is less than 2.6 microns when the focal length of the assembly is altered from 175 to 700 mm. By way of comparison, we would state that earlier systems having two movable lenses do not allow image displacement having an amplitude of less than 0.5 mm. to be obtained for the same bulk and the same range of focal lengths.

A table defining an example of an embodiment of a system according to the invention will be found hereinafter. This system is of the afocal type, and can be placed, for example, in front of a viewfinder objective for 16 mm. film.

Figure 11:
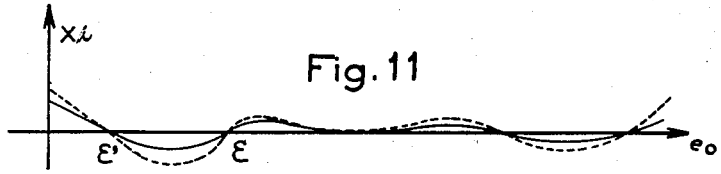
Figure 12:
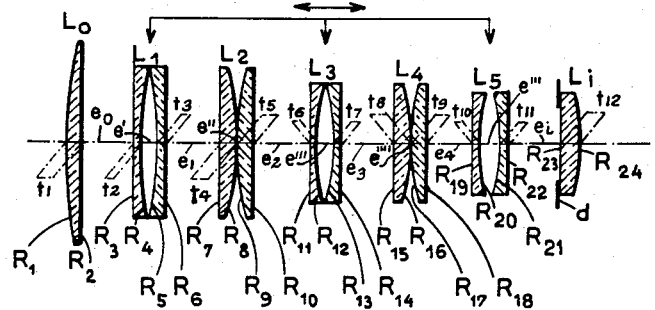
Figure 12 shows a particular example of an embodiment of the optical system.

The first column of the table indicates the numerical values of the successive radii of curvature $R_1$, $R_2$, $R_3$ ..., numbered as indicated in Figure 11; the second column indicates the thicknesses of glass $t_1 \ldots t_{12}$ or the air space separating the lenses $e_0$, $e_1 \ldots e_i$.

The third and fourth columns relate to the characteristics of the glasses, that is to say the refractive indices $n_D$ or N and the reverse indices of the dispersive powers $$\frac{n_D - 1}{n_F - 1} \text{ or } V$$

The diaphragm $d$ is assumed to be placed on the final lens.

[Magnification for $e_0 = 0.4798 - 0.506$. Magnification for $e_0 = 21.4793 - 1.977$]

| Radii of curvature (in millimetres) | Thicknesses of glass and air (in millimetres) | $n_D$ or N | $\dfrac{n_D - 1}{n_F - n_C}$ or V |
|---|---|---|---|
| $R_1 = +102$ | | | |
| $R_2 = \infty$ | $t_1 = 3.308$ | 1.62 | 57 |
| $R_3 = +400$ | $e_0 = 0.4798$ to $21.4798$ | | |
| $R_4 = +56.3009$ | $t_2 = 0.8$ | 1.62 | 60 |
| $R_5 = -78.3595$ | $e' = 4$ | | |
| $R_6 = +399.389$ | $t_3 = 0.8$ | 1.62 | 44.8 |
| $R_7 = \infty$ | $e_1 = 21.0831$ to $0.0831$ | | |
| $R_8 = -52.5516$ | $t_4 = 3.31$ | 1.62 | 57 |
| $R_9 = +52.5516$ | $e'' = 0$ | | |
| $R_{10} = \infty$ | $t_5 = 3.31$ | 1.62 | 57 |
| $R_{11} = \infty$ | $e_2 = 0.26$ to $21.26$ | | |
| $R_{12} = +39.3731$ | $t_6 = 0.8$ | 1.62 | 60 |
| $R_{13} = -39.3731$ | $e''' = 3.5$ | | |
| $R_{14} = \infty$ | $t_7 = 0.8$ | 1.62 | 36 |
| $R_{15} = \infty$ | $e_3 = 21.26$ to $0.26$ | | |
| $R_{16} = -52.5516$ | $t_8 = 3.31$ | 1.62 | 57 |
| $R_{17} = +52.5516$ | $e'''' = 0$ | | |
| $R_{18} = \infty$ | $t_9 = 3.31$ | 1.62 | 57 |
| $R_{19} = \infty$ | $e_4 = 0$ to $21$ | | |
| $R_{20} = +65.5235$ | $t_{10} = 0.8$ | 1.62 | 44.8 |
| $R_{21} = -65.5235$ | $e''''' = 4$ | | |
| $R_{22} = \infty$ | $t_{11} = 0.8$ | 1.62 | 60 |
| $R_{23} = \infty$ | $e_5 = 21.5629$ to $0.5629$ | | |
| $R_{24} = -102$ | $t_{12} = 3.308$ | 1.62 | 57 |

What is claimed is:

A variable focus optical system for continuous variation between two limits of the size of the image of an object at a fixed distance, comprising five alternately convergent and divergent lens groups axially aligned and air spaced apart, the second and fourth lens groups being fixed with a fixed distance between them and the second lens group having the same sign as the fourth lens group and the first, third and fifth lens groups being integrally connected for displacement together along the optical axis without change in the distances between them and said first, third and fifth lens groups each having the same sign which is the opposite sign to that of the second and fourth lens groups, the object being at a fixed distance from the second lens group and the image being at a fixed distance from the fourth lens group, whereby movement of said movable lens groups as a unit between their extreme positions passes the image six times through the same position, the system having optical characteristics of the following order wherein R is the radii of the lens refracting surfaces, $t$ is the axial thickness of the lens elements, $e$ is the axial spacing of the lens elements, N is the refractive index of the several lens materials and V is the dispersion ratio of the lens materials:

| Radii of curvature (in millimetres) | Thicknesses of glass and air (in millimetres) | $n_D$ or N | $\frac{n_D-1}{n_F-n_C}$ or V |
|---|---|---|---|
| $R_1 = +102$ | | | |
| | $t_1 = 3.308$ | 1.62 | 57 |
| $R_2 = \infty$ | | | |
| | $e_0 = 0.4798$ to $21.4798$ | | |
| $R_3 = +400$ | | | |
| | $t_2 = 0.8$ | 1.62 | 60 |
| $R_4 = +56.3009$ | | | |
| | $e' = 4$ | | |
| $R_5 = -78.3595$ | | | |
| | $t_3 = 0.8$ | 1.62 | 44.8 |
| $R_6 = +399.389$ | | | |
| | $e_1 = 21.0831$ to $0.0831$ | | |
| $R_7 = \infty$ | | | |
| | $t_4 = 3.31$ | 1.62 | 57 |
| $R_8 = -52.5516$ | | | |
| | $e'' = 0$ | | |
| $R_9 = +52.5516$ | | | |
| | $t_5 = 3.31$ | 1.62 | 57 |
| $R_{10} = \infty$ | | | |
| | $e_2 = 0.26$ to $21.26$ | | |
| $R_{11} = \infty$ | | | |
| | $t_6 = 0.8$ | 1.62 | 60 |
| $R_{12} = +39.3731$ | | | |
| | $e''' = 3.5$ | | |
| $R_{13} = -39.3731$ | | | |
| | $t_7 = 0.8$ | 1.62 | 36 |
| $R_{14} = \infty$ | | | |
| | $e_3 = 21.26$ to $0.26$ | | |
| $R_{15} = \infty$ | | | |
| | $t_8 = 3.31$ | 1.62 | 57 |
| $R_{16} = -52.5516$ | | | |
| | $e'''' = 0$ | | |
| $R_{17} = +52.5516$ | | | |
| | $t_9 = 3.31$ | 1.62 | 57 |
| $R_{18} = \infty$ | | | |
| | $e_4 = 0$ to $21$ | | |
| $R_{19} = \infty$ | | | |
| | $t_{10} = 0.8$ | 1.62 | 44.8 |
| $R_{20} = +65.5235$ | | | |
| | $e''''' = 4$ | | |
| $R_{21} = -65.5235$ | | | |
| | $t_{11} = 0.8$ | 1.62 | 60 |
| $R_{22} = \infty$ | | | |
| | $e_5 = 21.5629$ to $0.5629$ | | |
| $R_{23} = \infty$ | | | |
| | $t_{12} = 3.308$ | 1.62 | 57 |
| $R_{24} = -102$ | | | |

References Cited in the file of this patent
UNITED STATES PATENTS

| | | |
|---|---|---|
| 2,078,586 | Richter | Apr. 27, 1937 |
| 2,566,485 | Cuvillier | Sept. 4, 1951 |
| 2,718,817 | Back et al. | Sept. 27, 1955 |
| 2,778,272 | Reymond | Jan. 22, 1957 |
| 2,906,171 | Bergstein | Sept. 29, 1959 |